United States Patent
Honma (10) Patent No.: US 10,138,928 B2
(45) Date of Patent: Nov. 27, 2018

(54) PIVOTALLY SUPPORTING STRUCTURE AND CUP HOLDER COMPRISING PIVOTALLY SUPPORTING STRUCTURE

(71) Applicant: NIFCO INC., Yokosuka-shi, Kanagawa (JP)

(72) Inventor: Yoshitsugu Honma, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/523,835

(22) PCT Filed: Oct. 26, 2015

(86) PCT No.: PCT/JP2015/005355
§ 371 (c)(1),
(2) Date: May 2, 2017

(87) PCT Pub. No.: WO2016/075875
PCT Pub. Date: May 19, 2016

(65) Prior Publication Data
US 2017/0370404 A1    Dec. 28, 2017

(30) Foreign Application Priority Data

Nov. 14, 2014   (JP) ................. 2014-231509

(51) Int. Cl.
*F16C 11/08*       (2006.01)
*E05D 7/10*        (2006.01)
(Continued)

(52) U.S. Cl.
CPC ............ *F16C 11/083* (2013.01); *B60N 3/107* (2013.01); *E05D 3/02* (2013.01); *E05D 7/10* (2013.01);
(Continued)

(58) Field of Classification Search
CPC ... F16C 11/083; F16C 11/0671; F16C 11/242; B60N 3/101; E05D 7/016
See application file for complete search history.

(56) References Cited

U.S. PATENT DOCUMENTS 4,290,168 A * 9/1981 Binge ................. E05D 11/1007
                                                    16/271
5,008,975 A * 4/1991 Wang ........................ E05D 7/10
                                                    16/254
(Continued)

FOREIGN PATENT DOCUMENTS

| JP | S61-27035 U | 2/1986 |
| JP | S62-200815 U | 12/1987 |
| JP | H06-50325 A | 2/1994 |
| JP | 2000-008687 A | 1/2000 |
| JP | 2011-185301 A | 9/2011 |

OTHER PUBLICATIONS

PCT, "International Search Report for International Application No. PCT/JP2015/005355" dated May 2, 2017.

*Primary Examiner* — Anita M King
(74) *Attorney, Agent, or Firm* — Manabu Kanesaka (57) ABSTRACT

A turning member includes a pair of projecting shafts projecting coaxially in a shaft wall member formed in both right and left end portions of a shaft member. The turning member further includes a projecting portion projecting on a tip face of the projecting shaft, wherein a diameter is reduced relative to the projecting shaft. Usually, the projecting shaft is received in a bearing hole of a base member, so that the turning member is axially supported on the base member. When an unexpected external force is applied to the turning member, the projecting shaft is disengaged from the bearing hole so as to absorb an impact, thereby preventing damage to members, and the projecting portion engages (Continued)

the bearing hole and is held in a state received in the bearing hole, thereby preventing the turning member from dropping out.

5 Claims, 9 Drawing Sheets

(51) Int. Cl.
    *F16C 11/04* (2006.01)
    *F16C 11/06* (2006.01)
    *F16M 11/24* (2006.01)
    *B60N 3/10* (2006.01)
    *E05D 3/02* (2006.01)
    *E05D 11/06* (2006.01)

(52) U.S. Cl.
    CPC .............. *E05D 11/06* (2013.01); *F16C 11/04* (2013.01); *F16C 11/045* (2013.01); *F16C 11/0671* (2013.01); *F16M 11/242* (2013.01); *B60N 3/101* (2013.01); *E05D 7/1016* (2013.01); *E05Y 2201/48* (2013.01); *E05Y 2900/538* (2013.01)

(56) References Cited

U.S. PATENT DOCUMENTS

| | | | |
|---|---|---|---|
| 5,183,352 A | 2/1993 | Carpenter | |
| 5,893,478 A * | 4/1999 | Maruoka | B60R 7/04 16/354 |
| 2003/0080131 A1* | 5/2003 | Fukuo | B60R 7/04 220/264 |
| 2008/0083857 A1* | 4/2008 | Kato | B60N 3/107 248/149 |
| 2011/0297201 A1* | 12/2011 | Chen | E04H 15/42 135/144 |
| 2013/0022300 A1 | 1/2013 | Fukumoto | |

* cited by examiner

PIVOTALLY SUPPORTING STRUCTURE AND CUP HOLDER COMPRISING PIVOTALLY SUPPORTING STRUCTURE

RELATED APPLICATIONS

The present application is National Phase of International Application No. PCT/JP2015/005355 filed Oct. 26, 2015, and claims priority from Japanese Application No. 2014-231509, filed Nov. 14, 2014, the disclosure of which is hereby incorporated by reference herein in its entirety.

BACKGROUND OF THE INVENTION

Field of the Invention

The present invention relates to a pivotally supporting structure turnably supporting a member. Especially, the present invention relates to the pivotally supporting structure applied to a cup holder mounted on a vehicle.

DESCRIPTION OF RELATED ART

As for the pivotally supporting structure applied to the cup holder and the like, for example, there is proposed a structure described in Patent Document 1. In the pivotally supporting structure described in the Patent Document 1, there is provided a tapered shape in one or both of a shaft portion and a bearing portion. When a pivotally supported turning member is locked in a base member and is in a limit of a turning range, if an unexpected rotation load beyond the limit thereof is applied to the turning member, an engagement between the shaft portion and the bearing portion is instantly released by an action of the tapered shape. Consequently, damage to the shaft portion and the bearing portion is prevented.

PRIOR ART DOCUMENT

Patent Document

Patent Document 1: Japanese Unexamined Patent Application Publication No. 2000-8687

BRIEF SUMMARY OF THE INVENTION

In the pivotally supporting structure described in the Patent Document 1, however, in a case wherein the unexpected rotation load is applied, a shaft support relative to the turning member is released, so that the turning member drops out, and due to an impact by a fall thereof, there is a possibility that the turning member might be damaged. Also, the turning member is required to be attached again to consume user's time. Moreover, in a case wherein a container is held in a state wherein liquid is contained in the container which does not have a lid such as a paper cup and the like or the container without the lid, there is a problem that the container falls with the turning member and the liquid spills.

On the other hand, if the tapered shape is not provided, when the unexpected rotation load is applied to the turning member, there is a possibility that the shaft portion or the bearing portion might be damaged. If the shaft portion and the bearing portion are made of a robust material or shape in order to prevent damage, there is a problem of increasing a production cost.

In view of the aforementioned problems, an object of the present invention is to provide a pivotally supporting structure which can prevent damage to the shaft portion and the bearing portion, and prevent the turning member from dropping out.

One aspect of the present invention is a pivotally supporting structure (6) for pivotally supporting a turning member (16) in a base member (14), and comprises a pair of projecting shafts (46) projected coaxially with each other in shaft wall members (44) on right and left of one member of the turning member or the base member; bearing holes (26) closely facing relative to the shaft wall member and provided in bearing wall members (22) on right and left of the other member of the turning member or the base member to receive the projecting shafts; and projecting portions (48, 64, 74) projected on tip faces of the projecting shafts.

According to the structure, even if the projecting shaft drops out of the bearing hole, the projecting portion engages the bearing hole, thereby preventing an opening member from dropping out of the base member. Also, the projecting shaft drops out of the bearing hole so as to reduce an impact by an external force and prevent damage to the projecting shaft, the shaft wall member, and the bearing wall member.

As for another aspect of the present invention, in the aforementioned structure, the turning member and the base member collide with each other so as to restrict a turning range between both the members, and predetermined flexibility is provided in one or both of the shaft wall member and the bearing wall member, so that when an external force beyond a limit of the turning range acts between the turning member and the base member, one or both of the shaft wall member and the bearing wall member having flexibility deforms, so that the projecting shaft drops out of the bearing hole and the projecting portion engages the bearing hole.

According to the structure, a direction of the applied external force is converted in a direction of relatively rotating between the projecting shaft and the bearing hole as a supporting point where the turning member and the base member collide with each other, so that a large flexural capacity in a right and left direction is not required for both wall members. Also, one or both of the wall members bend so as to absorb the impact of the external force, thereby preventing damage to the projecting shaft, the shaft wall member, and the bearing wall member.

As for another aspect of the present invention, in the aforementioned structure, as the turning member and the base member carry out relative turning to come close to the limit of the turning range, a spring member (30) generating an urging force in a direction of inhibiting the relative turning is provided between the shaft wall member and the bearing wall member.

According to the structure, the impact by the external force applied in a vicinity of the limit of the turning range is absorbed by the urging force in the direction of inhibiting the turning of the spring member, thereby preventing damage to structural members.

As for another aspect of the present invention, in the aforementioned structure, a tapered face (50) is formed at a tip of at least one projecting portion, and in the limit of the turning range, a side portion on a side where the tapered face is formed does not face a side where the projecting shaft and the bearing hole press to each other.

According to the structure, an attachment of the turning member to the base member becomes easy by the tapered face, however, after the attachment, the tapered face does not cause a dropout of the projecting portion out of the bearing hole.

Another aspect of the present invention is a cup holder (2) comprising the pivotally supporting structure with the aforementioned structure; and a box member (4) internally fixing the base member of the pivotally supporting structure, and wherein an upper portion is open. The turning member includes an oscillating member (38) extending in such a way as to form a surface (42) parallel to a shaft line of the turning, and the aforementioned surface is disposed approximately horizontally in one limit of the turning range, and faces upwardly, and downward turning is controlled.

According to the structure, when a relatively short container (cup) is held, the surface of the oscillating member is set as a bottom, and when a relatively tall container is held, the turning member is turned in such a way as to push up to set a bottom wall of the box member as the bottom so as to hold a container with a different height in an appropriate state.

As for another aspect of the present invention, in the aforementioned structure, the oscillating member further includes a back surface wherein an intermediate area in the right and left direction is curved in such a way as to be concaved relative to both right and left side portions; and a base end face connecting the surface and the back surface on a base end side, and both right and left side portions (56) of the base end face are locked in the base member so as to restrict the one limit of the turning range.

According to the structure, when the external force is received in one limit of the turning range, a rotational force is applied between the projecting shaft and the bearing hole as a supporting point where both right and left side portions of the base end face are locked in the base member, however, compared to a step between the projecting shaft and the projecting portion, a distance from the projecting shaft and the projecting portion to a locking point can be sufficiently increased, so that an angle change of the turning member is small, and the surface of the oscillating member does not incline largely from a horizontal position. Consequently, liquid contained in the container supported in the oscillating member is difficult to be spilled. Also, many containers have a cylindrical shape or a shape similar to the cylindrical shape, so that even when the relatively tall container is held by pushing the turning member up, both right and left side portions projecting on the back surface of the oscillating member do not inhibit the container from receiving, and a maximum diameter of a receptive container is not reduced.

When an unexpected external force is applied, the projecting shaft is disengaged from the bearing hole, thereby preventing damage to members, and the projecting portion engages the bearing hole, thereby preventing the turning member from dropping out.

DETAILED DESCRIPTION OF THE INVENTION

Hereinafter, with reference to the drawings, a cup holder 2 which is one embodiment of the present invention will be explained in detail. The cup holder 2 according to the present embodiment is attached to a console box extended in a front and back direction of a vehicle body between a driver's seat and a passenger's seat of an automobile. In the following explanation, directions of front and back, right and left, and up and down of the cup holder 2 correspond to directions of front and back, right and left, and up and down of the automobile.

Figure 1:
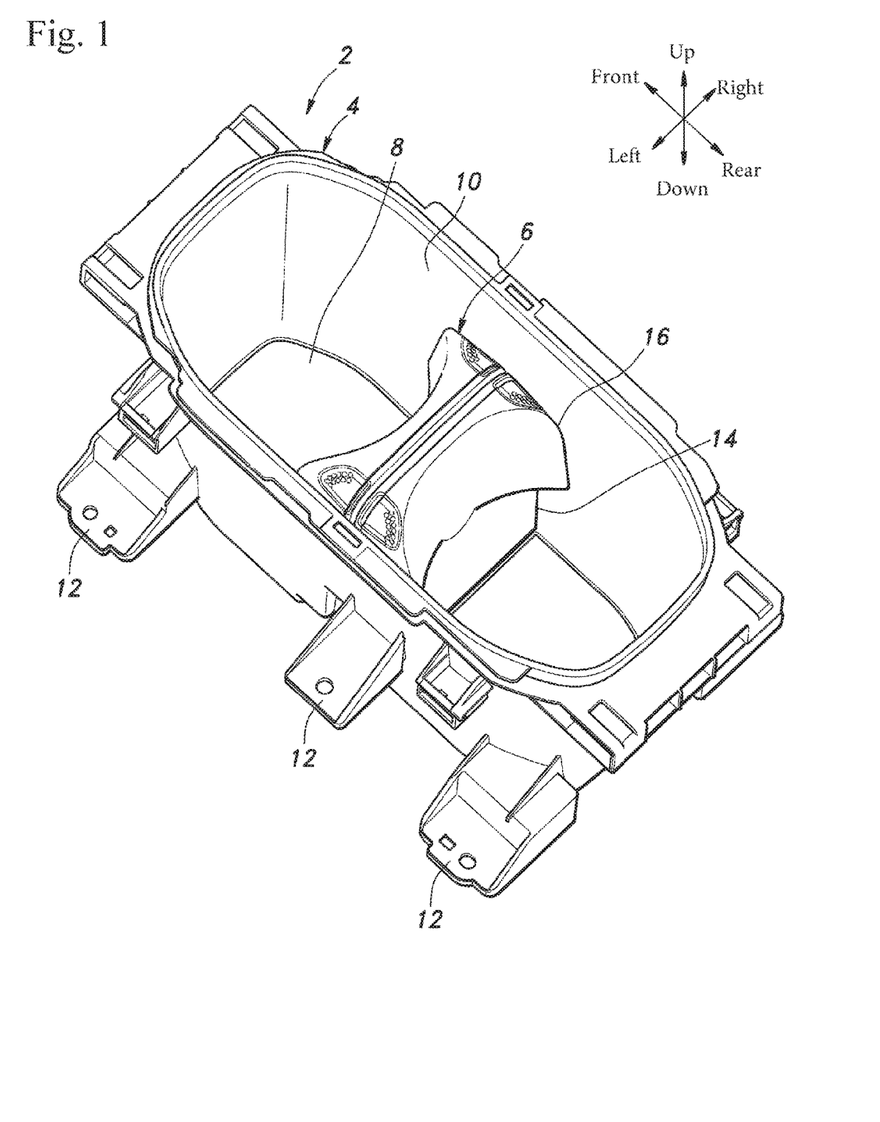
FIG. 1 is a perspective view of a cup holder wherein a pivotally supporting structure is applied according to an embodiment.

FIG. 1 is an overall perspective view showing the cup holder 2 according to the embodiment of the present invention. The cup holder 2 comprises a box member 4, and a separator 6 including a pivotally supporting structure and fixed inside the box member 4. A shape of the cup holder 2 is symmetrical approximately corresponding to an original axis when rotated at 180 degrees around a central axis in the up and down direction. The shape of the cup holder 2 may be symmetrical in a mirror image in the front and back in addition to a rotational symmetry or instead of the rotational symmetry.

The box member 4 is a molded article made of a resin, and has a bottomed box shape wherein an upper portion is open. The box member 4 includes a bottom wall 8 having a rounded rectangular shape, and a peripheral wall 10 provided to stand at a peripheral edge of the bottom wall 8, and from an outer face of the peripheral wall 10, there is extended projecting pieces 12 for fixing the cup holder 2 to the vehicle body by a screw and the like. The separator 6 is fixed inside the box member 4, and partitions the inside of the box member 4 into front and back. Two front and back spaces partitioned by the separator 6 can receive one beverage container respectively.

Figure 2:
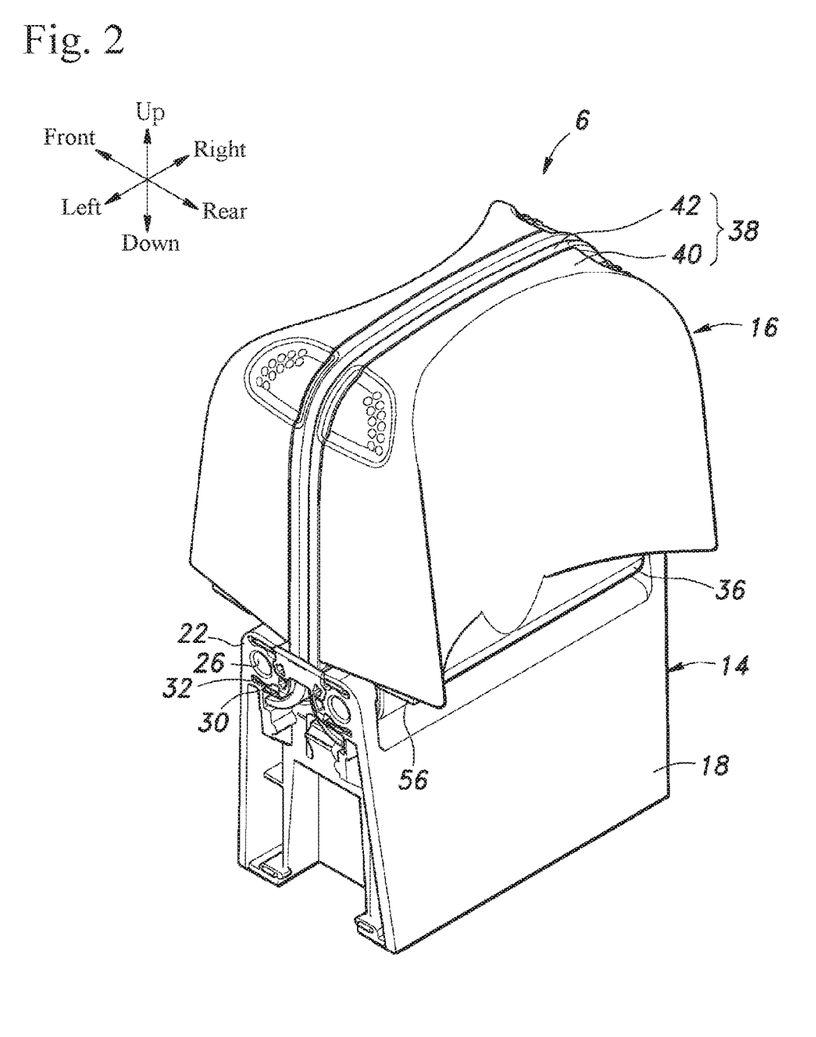
FIG. 2 is a perspective view of a closed state of the pivotally supporting structure according to the embodiment.
Figure 3:
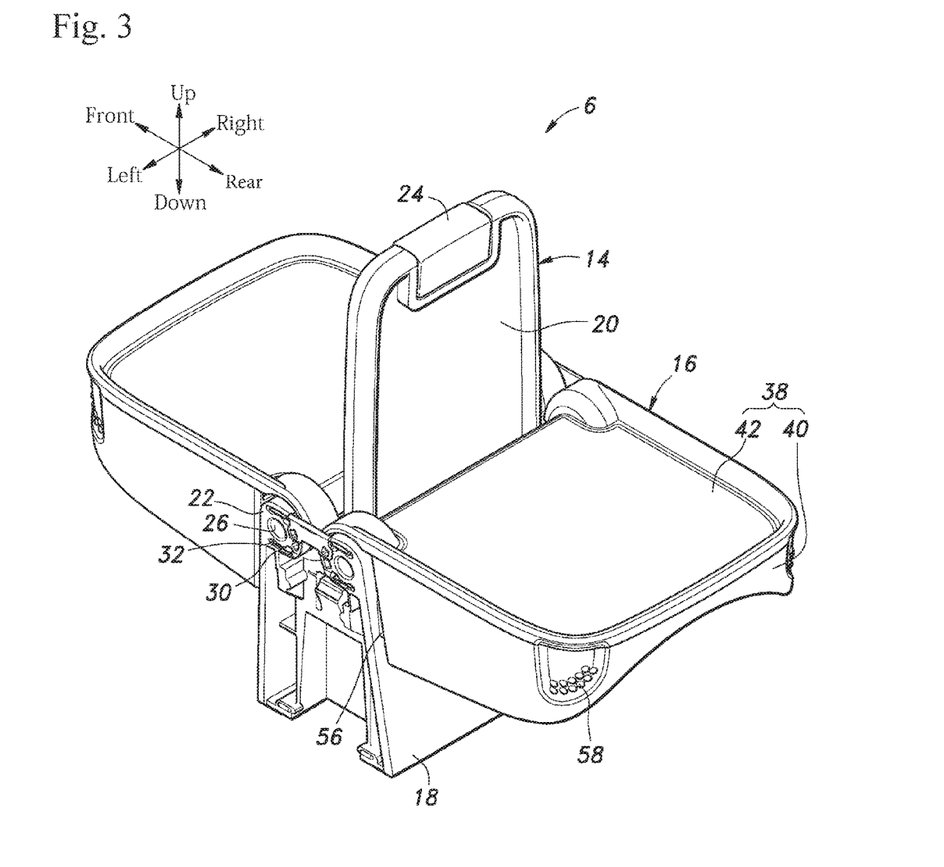
FIG. 3 is a perspective view of an open state of the pivotally supporting structure according to the embodiment.

As shown in FIG. 2 and FIG. 3, the separator 6 includes a base member 14, and two turning members 16 axially supported on the base member 14. In the explanation hereinafter, a state wherein a surface of the turning member 16 is close to the base member 14 (FIG. 2) is called a closed state, and a state wherein the surface of the turning member 16 is disposed approximately horizontally (FIG. 3) is called an open state.

Figure 4:
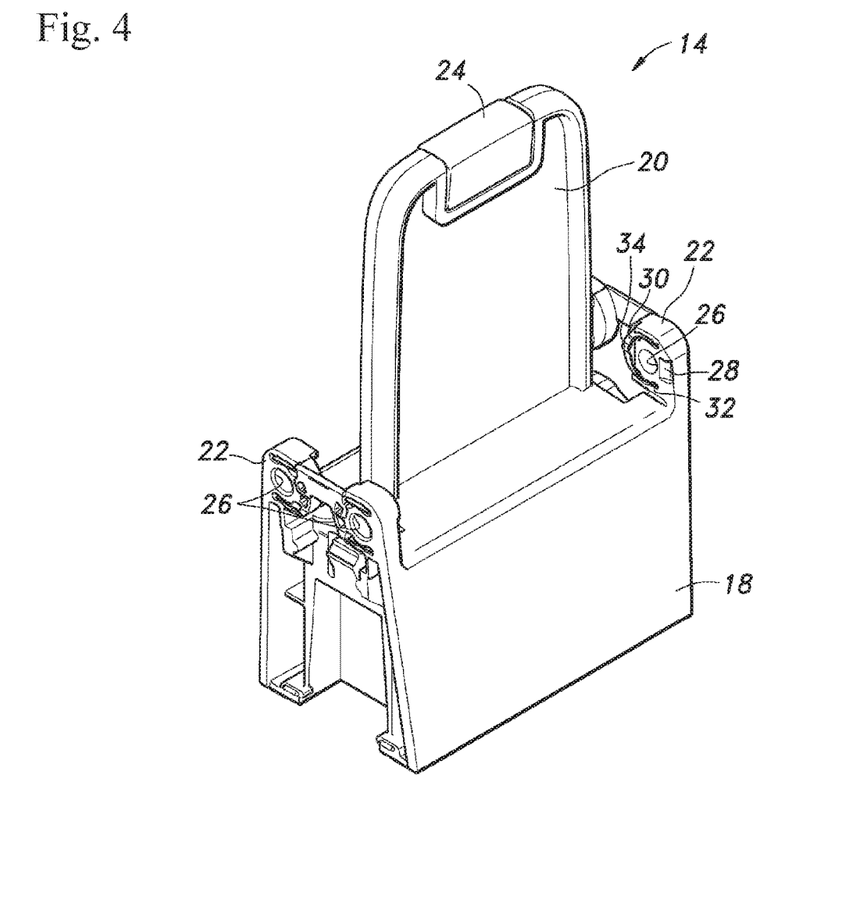
FIG. 4 is a perspective view of a base member according to the embodiment.

As shown in FIG. 4, the base member 14 is a molded article made of a resin, and includes a leg portion 18 fixed inside the box member 4; a partition plate 20 extending upwardly from an upper face of the leg portion 18; and a pair of bearing wall members 22 extending upwardly from upper faces of both right and left end portions of the leg portion 18.

In the leg portion 18, a bottom face abuts against an upper face of the bottom wall 8 of the box member 4, and right and left side faces abut against right and left inner peripheral faces of the peripheral wall 10 of the box member 4 in such a way as to divide the inside of the box member 4 into two, i.e. front and back equal portions, and front and back faces face front and back inner peripheral faces of the peripheral wall 10 of the box member 4. A height of the leg portion 18 is approximately one third to one half of a depth of the box member 4 (see FIG. 1).

The partition plate 20 having an approximately flat plate shape extends from approximately the center in the front and back direction of the upper face of the leg portion 18 in such a way that a main face faces in the front and back direction, and a thickness thereof is thinner than a thickness in the front and back direction of the leg portion 18. Both right and left side ends of the partition plate 20 are slightly separated from an inner face of the peripheral wall 10 of the box member 4. At the center in the right and left direction in an upper portion of the partition plate 20, there is attached a buffer member 24 made of rubber. The buffer member 24 slightly projects in the front and back direction more than the partition plate 20, and when the turning member 16 comes to the closed state, the buffer member 24 reduces a collision between the turning member 16 and the partition plate 20.

Figure 5:
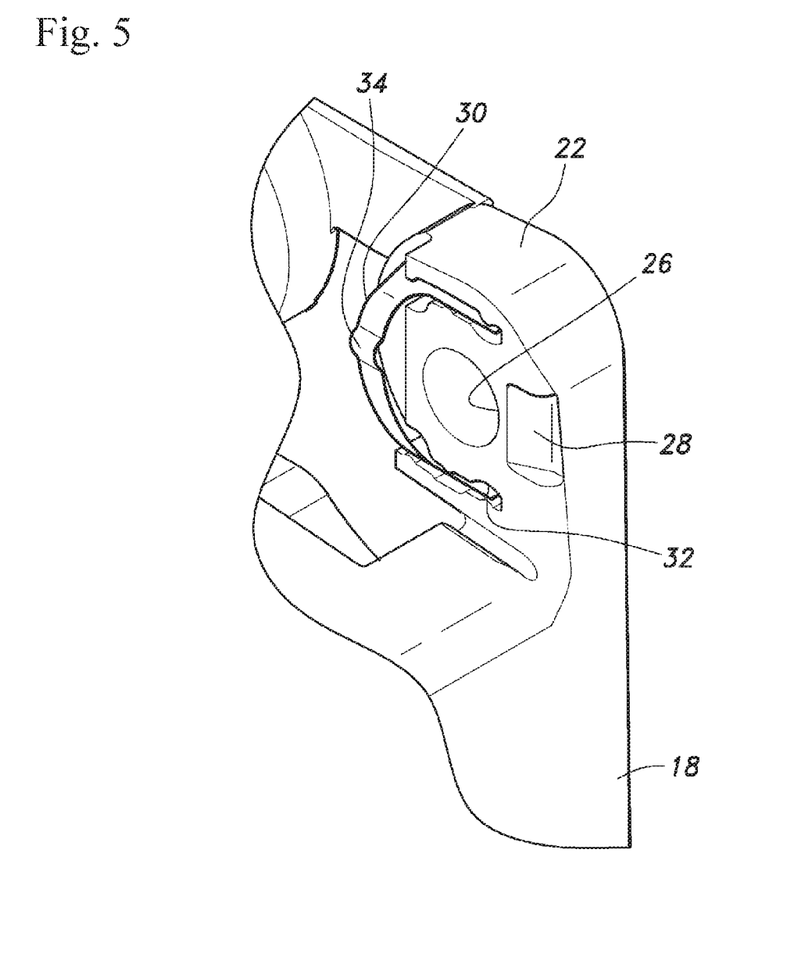
FIG. 5 is an enlarged view of a periphery of a bearing hole in FIG. 4.

The pair of bearing wall members 22 sandwiches the partition plate 20, and faces to each other in the right and left direction. In the pair of bearing wall members 22, respectively, there are provided two bearing holes 26 passing through in the right and left direction, and one bearing hole 26 is provided at the front relative to the partition plate 20, and the other bearing hole 26 is provided at the back relative to the partition plate 20. A thickness of an intermediate area between the two bearing holes 26 is made thinner compared to a circumference of the bearing hole 26 so as to easily bend in the right and left direction. FIG. 5 is an enlarged view of a periphery of the bearing hole 26 on a back side of the right bearing wall member 22. The two bearing holes 26 respectively form a pair with the bearing hole 26 provided in the facing bearing wall member 22. The pair of bearing holes 26 is formed coaxially on the right and left. Also, on inner faces facing to each other of the pair of bearing wall members 22, there are formed tapered faces 28 in such a way that each other's facing distance becomes longer as the distance becomes far from the bearing holes 26 on an opposite side in the front and back direction relative to the partition plate 20. Also, in the bearing wall member 22, there is formed an attachment hole 32 for attaching a plate spring 30 around each bearing hole 26.

The plate spring 30 has an approximately U shape in a side view, an opening side of the U shape is fitted into the attachment hole 32 to be supported in the bearing wall members 22, and a bottom portion of the U shape faces the center in the front and back direction to form a free end of the plate spring 30. In the bottom portion of the U shape of the plate spring 30, approximately a main face has a plate shape facing the right and left direction, and there is formed a curved portion 34 curved toward a side opposite to the bearing wall member 22 wherein the plate spring 30 is attached, i.e. a center side in the right and left direction. A ridgeline of the curved portion 34 extends in a radial direction of the bearing hole 26.

Figure 6:
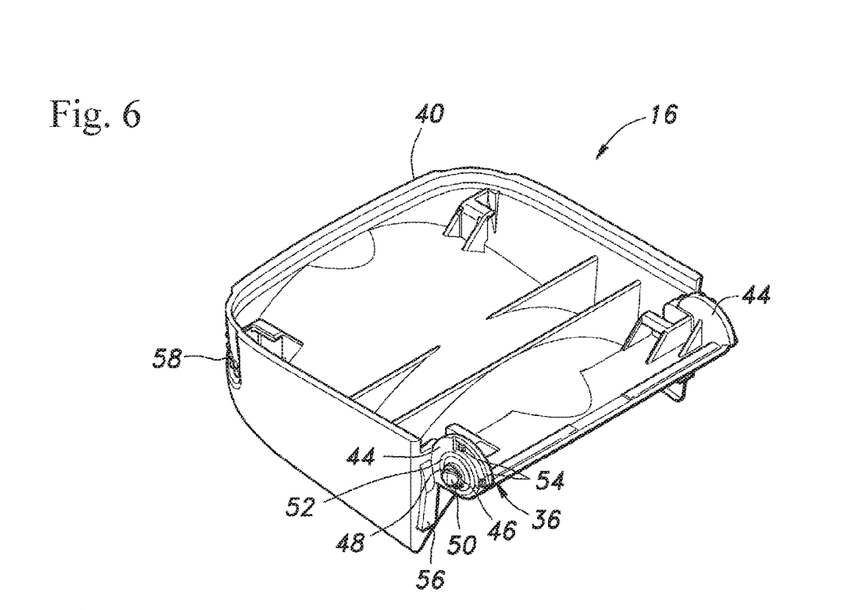
FIG. 6 is a perspective view of one portion of a turning member according to the embodiment.
Figure 7:
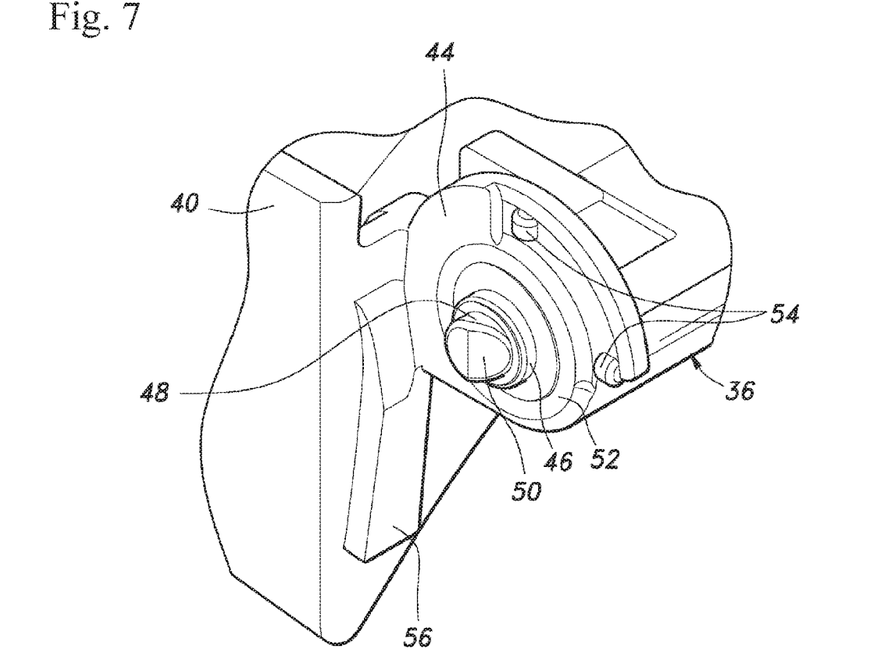
FIG. 7 is an enlarged view of a periphery of a projecting shaft in FIG. 6.

As shown in FIGS. 2 and 3, the turning member 16 is a molded article made of a resin, and includes a shaft member 36 axially supported on the base member 14, and an oscillating member 38 extending from the shaft member 36. The oscillating member 38 oscillates around the shaft member 36, namely, a free end turns in such a way as to be displaced in a predetermined range on a circular arc track around the shaft member 36. The oscillating member 38 includes an oscillating-member main member 40, and a tray plate 42 fixed on an upper face in an open state of the oscillating-member main member 40. FIG. 6 is a perspective view of the turning member 16 wherein the tray plate 42 is omitted, and FIG. 7 is an enlarged view of a side face of the shaft member 36 thereof.

The shaft member 36 includes shaft wall members 44 on both right and left side portions. The shaft wall member 44 has approximately a circular plate shape, and a main face thereof is disposed in such a way as to face a shaft line direction, i.e. the right and left direction. On a main face outside the right and left direction of the shaft wall member 44, there are projected projecting shafts 46 having a column shape. Two projecting shafts 46 projected on the right and left shaft wall members 44 are coaxially disposed, and form a pair. The pair of projecting shafts 46 is received in the bearing hole 26 of the base member 14, so that the turning member 16 is turnably supported in the base member 14. An outer diameter of the projecting shaft 46 is approximately equal to an inner diameter of the bearing hole 26, and an outer periphery of the projecting shaft 46 slides on an inner periphery of the bearing hole 26, so that the turning member 16 turns. At a tip face of the projecting shaft 46, there is projected a projecting portion 48 wherein a diameter thereof is reduced relative to the projecting shaft 46. A shape of the projecting portion 48 has approximately a shape wherein a tip side of a column shape is obliquely notched relative to a shaft line, and the projecting portion 48 is coaxially disposed with the projecting shaft 46. A tapered face 50 of the projecting portion 48 formed by the notched shape is formed in such a way that a projecting length in the shaft line direction becomes longer toward a side portion on a side where the oscillating member 38 extends from a side portion on a side opposite to the side where the oscillating member 38 extends.

Also, on the main face outside the right and left direction of the shaft wall member 44, there is formed a circular projecting piece 52 surrounding the projecting shaft 46 coaxially with the projecting shaft 46. A projecting length of the projecting piece 52 is shorter compared to a projecting length of the projecting shaft 46. The projecting piece 52 abuts against the bearing wall member 22 of the base member 14, and reduces a friction resistance between the turning member 16 and the base member 14 when the turning member 16 turns relative to the base member 14. Moreover, on a main face outside the shaft wall member 44, there are formed two convex portions 54 on an outside in a radial direction more than the projecting piece 52. One of the two convex portions 54 is formed on a side where the tapered face 50 of the projecting portion 48 is formed relative to a shaft center, and the other is formed on a tray plate 42 side. In a vicinity of a corresponding limit of a turning range, the respective two convex portions 54 press the curved portion 34 of the plate spring 30 attached to the base member 14, and in the limit of the turning range, the convex portions 54 are disposed at a position where they climbed over the curved portion 34. On the outside in the radial direction more than the projecting piece 52, the main face of the shaft wall member 44 between the two convex portions 54 is concaved so that the curved portion 34 of the plate spring 30 does not contact.

The oscillating member 38 is a portion extending from the shaft member 36, and approximately, one face of a rectangular parallelepiped shape has a shape curved in a concaved shape. Both right and left side faces of the oscillating member 38 closely face the inner face of the box member 4, and in the open state, the free end of the oscillating member 38 faces the inner face of the peripheral wall 10 of the box member 4 at an interval wherein approximately a user can insert fingers.

A shape of the tray plate 42 has a shape wherein approximately a corner on a free end side is rounded relative to a flat plate of a rectangular shape, and an edge is raised on a free end and both right and left ends on a surface side. A back surface of the oscillating-member main member 40, i.e. a face on a side opposite to a side wherein the tray plate 42 is fixed is curved in a concaved shape. The back surface of the oscillating-member main member 40 is curved in the right and left direction, and is straight in a direction toward the free end from a base end. A thickness from the tray plate 42 on a base end side to the back surface of the oscillating-member main member 40 is approximately equal to a thickness of the shaft member 36 at a center portion in the right and left direction, and is thicker than a center portion at both right and left side portions. On a face on the base end side of the oscillating-member main member 40, there are provided locking portions 56 formed in such a way as to project relative to a flat face at both right and left side portions. In the open state, the locking portions 56 are locked in the leg portion 18 of the base member 14. At right and left corner portions on a free end side of the oscillating-member main member 40, there is formed a plurality of projections 58 for preventing user's fingers from sliding.

The oscillating member 38 can oscillate between the closed state (FIG. 2) wherein a surface of the tray plate 42 abuts against the buffer member 24 attached to the partition plate 20, and the open state (FIG. 3) wherein the surface of the tray plate 42 turns approximately at 90 degrees from the closed state to face upwardly, and the locking portion 56 is locked in the leg portion 18 of the base member 14. In the cup holder 2, in the closed state of the turning member 16, a space holding a container and the like is defined by a bottom face and an inner peripheral face of the box member 4, the leg portion 18 of the base member 14, and the back surface of the oscillating member 38 so as to be suitable for holding a relatively tall beverage container such as a plastic bottle with a capacity of 500 ml. At that time, a center portion in the right and left direction of the leg portion 18 and a center portion in the right and left direction of the back surface of the oscillating member 38 align approximately in a straight line, and the straight line slightly inclines relative to the up and down direction in such a way that an upper portion of the defined space widens. Also, in the cup holder 2, in the open state of the turning member 16, the space holding the container and the like is defined by the surface of the tray plate 42, the inner peripheral face of the box member 4, and the main face of the partition plate 20 of the base member 14 so as to be suitable for holding a relatively short beverage container such as a can or a paper cup.

Next, a function and an effect of the cup holder 2 will be explained.

A user can switch between the closed state and the open state by moving the turning member 16 with fingers. The closed state of the turning member 16 is maintained by its own gravity of the turning member 16 or a frictional force between the projecting shaft 46 and the bearing hole 26, and by the curved portion 34 of the plate spring 30 locking the convex portion 54 disposed on a side opposite to the oscillating member 38. The open state of the turning member 16 is maintained by the locking portion 56 of the turning member 16 locked in the leg portion 18 of the base member 14.

In a vicinity of the closed state of the turning member 16, the convex portion 54 disposed on the tray plate 42 side slides in such a way as to climb over the curved portion 34 of the plate spring 30, and presses, so that the turning member 16 receives a resistance force toward an open direction. Consequently, an impact when the tray plate 42 collides with the buffer member 24 is softened. Also, in a vicinity of the open state of the turning member 16, the convex portion 54 disposed on the side opposite to the oscillating member 38 slides in such a way as to climb over the curved portion 34 of the plate spring 30, and presses, so that the turning member 16 receives a resistance force toward a closing direction. Consequently, an impact when the locking portion 56 collides with the leg portion 18 is softened. Also, in the closed state and the open state, the convex portion 54 climbs over the curved portion 34 so as to obtain a moderate feeling.

Figure 8:
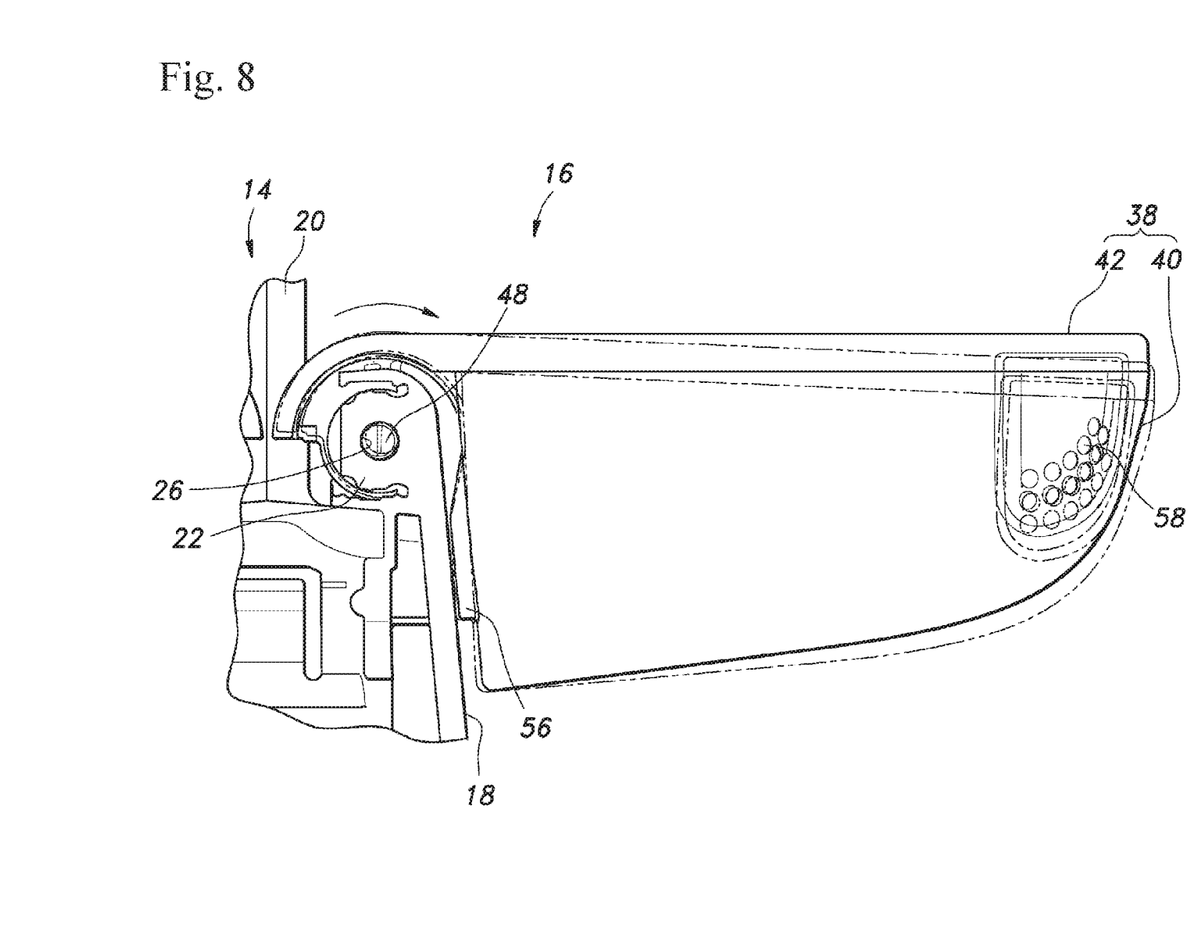
FIG. 8 is a side view showing a function of the pivotally supporting structure according to the present embodiment.
Figure 9A:
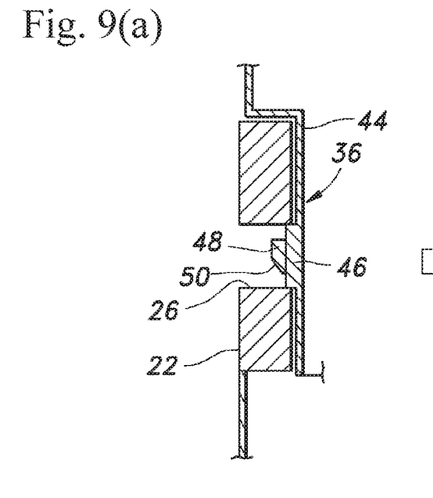
FIGS. 9(a) and 9(b) are schematic cross-sectional views showing the function of the pivotally supporting structure according to the present embodiment.
Figure 9B:
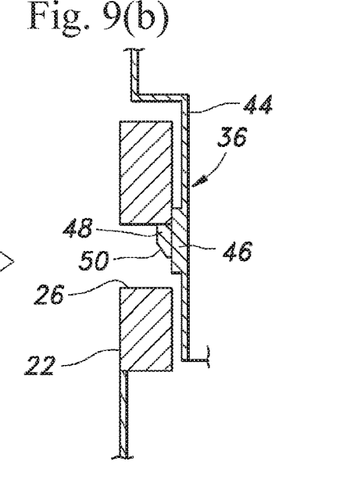

With reference to FIG. 8 and FIGS. 9(a) and 9(b), a disengagement operation of the projecting shaft 46 from the bearing hole 26 will be explained. In the open state, FIG. 8 and FIGS. 9(a) and 9(b) show a state wherein the projecting shaft 46 is received in the bearing hole 26 (solid lines in FIG. 8, and FIG. 9(a)), and a state wherein the projecting shaft 46 is disengaged from the bearing hole 26 (two-dot chain lines in FIG. 8, and FIG. 9(b)). Incidentally, in FIGS. 9(a) and 9(b), the plate spring 30 is omitted. The bearing wall member 22 of the base member 14 and the shaft wall member 44 of the turning member 16 closely face each other, however, they include a portion having a thin plate shape made of a resin so as to bend in a direction of separating from each other. Consequently, for example, in the open state, when an external force beyond the limit of the turning range acts, the external force thereof is converted to a force in a direction of displacing the shaft member 36 in a direction of an arrow in FIG. 8 as a supporting point where the locking portion 56 is locked in the leg portion 18. At that time, the bearing wall member 22 and the shaft wall member 44 bend in the direction of separating from each other, and the projecting shaft 46 disengages from the bearing hole 26, however, the projecting portion 48 engages the bearing hole 26 and is maintained in a received state, so that the turning member 16 is kept in a state supported in the base member 14 so as not to drop out. A displacement amount at that time, i.e. a reduced diameter width of the projecting portion 48 relative to the projecting shaft 46, is sufficiently short relative to a distance from the projecting shaft 46 and the projecting portion 48 to the locking portion 56, so that an angle change of the turning member 16 becomes slight. Namely, even if the external force acts and the projecting shaft 46 drops out of the bearing hole 26, the surface of the tray plate 42 only slightly inclines from a horizontal position so as to suppress a beverage from spilling out of the beverage container supported in the tray plate 42. Also, the back surface of the oscillating-member main member 40 is curved, so that even if a distance from the shaft member 36 to the locking portion 56 lengthens, a width or a diameter of a receptive container in the closed state can be prevented from being reduced. Namely, the back surface of the oscillating-member main member 40 defines one side face of a container receiving space in the closed state, however, many beverage containers have a cylindrical shape or a nearly cylindrical shape, so that even if right and left of the back surface of the oscillating-member main member 40 are projected for forming the locking portion 56, a maximum diameter of the receptive container is not reduced.

Also, the bearing wall member 22 and the shaft wall member 44 bend so as to absorb an impact by the external force and suppress damage to the projecting shaft 46, the shaft wall member 44, and the bearing wall member 22.

Also, in a state wherein the projecting shaft 46 is dropped out of the bearing hole 26, the projecting portion 48 is received in the bearing hole 26, and an elastic force wherein the bent bearing wall member 22 and shaft wall member 44 attempt to return into an original state is generated, so that a user can easily return the projecting shaft 46 to the bearing hole 26 by moving the turning member 16.

Also, the tapered face 50 of the projecting portion 48 is provided for receiving the projecting shaft 46 and the projecting portion 48 into the bearing hole 26 by sliding on the tapered face 28 of the bearing wall member 22 in a production process of the cup holder 2. As shown in FIGS. 9(a) and 9(b), the tapered face 50 of the projecting portion 48 is positioned on a side opposite to a disengagement direction when the projecting shaft 46 is disengaged from the bearing hole 26 in the open state so as not to have a function of assisting the disengagement of the projecting portion 48 from the bearing hole 26. Even in the closed state, the tapered face 50 is shifted approximately at 90 degrees from the disengagement direction so as to be the same.

Also, in the open state, when the external force beyond the limit of the turning range acts, the external force thereof is converted to the force in the direction of the arrow in FIG. 8 as the supporting point where the locking portion 56 is locked in the leg portion 18, so that a bending moment relative to the bearing wall member 22 wherein the bearing hole 26 is formed occurs in a width direction (up and down direction) larger than a thickness direction (right and left direction) of the bearing wall member 22. Compared to the thickness direction, a load-bearing force in the width direction is sufficiently large, so that even if a weld line when forming the base member 14 occurs in the bearing wall member 22, the bearing wall member 22 can withstand the external force thereof, and a thickness of a portion connecting the two bearing holes 26 can be reduced, so that the bearing wall member 22 can easily bend.

Next, a modified embodiment according to the present invention will be explained. In the explanation, regarding the structures in common with the aforementioned embodiment, an explanation thereof will be omitted and the same signs will be assigned.

Figure 10:
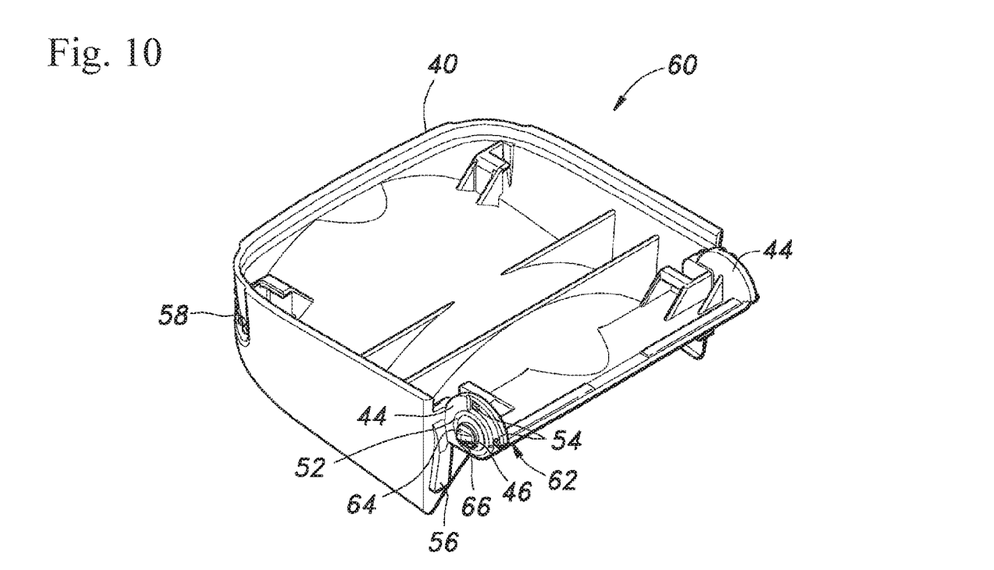
FIG. 10 is a perspective view of one portion of the turning member according to a modified embodiment.

FIG. 10 is a perspective view showing a turning member 60 according to the modified embodiment in a state wherein the tray plate 42 is omitted. A shape of a projecting portion 64 of a shaft member 62 differs from the aforementioned embodiment. The shape of the projecting portion 64 is approximately a shape wherein one side at a tip side is notched from a rectangular parallelepiped. A tapered face 66 by a notch shape is a shape for attaching the turning member 60 to the base member 14 as with the aforementioned embodiment. Each length in a direction orthogonal to a shaft line direction of the projecting portion 64 is shorter than a diameter of the projecting shaft 46. Thus, even if the projecting portion 64 is not on the column shape or not coaxial with the projecting shaft 46, provided that the projecting portion 64 is projected relative to the projecting shaft 46, namely, provided that a length in each direction orthogonal to the shaft line direction is reduced smaller than the diameter of the projecting shaft 46 so as to produce a step relative to the projecting shaft 46, and the projecting portion 64 extends from the tip face of the projecting shaft, when the projecting shaft 46 drops out of the bearing hole 26, the projecting portion 64 engages the bearing hole 26 and is received so as to have a function of preventing a dropout of the turning member 60.

Figure 11:
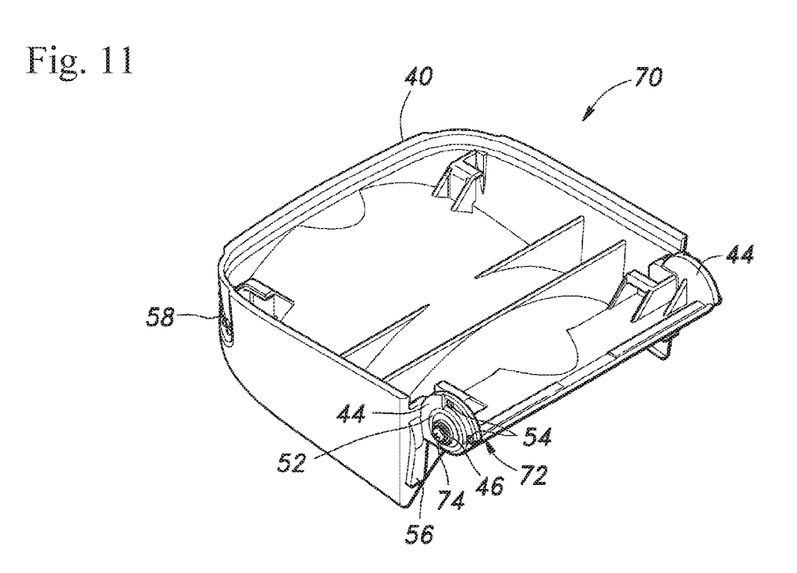
FIG. 11 is a perspective view of one portion of the turning member according to another modified embodiment.

FIG. 11 is a perspective view showing a turning member 70 according to another modified embodiment in the state wherein the tray plate 42 is omitted. A projecting portion 74 of a shaft member 72 is formed by a head portion of a screw such as a tapping screw and the like so as to differ from the aforementioned embodiments. A diameter of the head portion of the screw forming the projecting portion 74 is smaller than the diameter of the projecting shaft 46, and there is formed a step between the head portion of the screw and a tip of the projecting shaft 46. In a state wherein the projecting shaft 46 is received in the bearing hole 26 of the base member 14, the tapping screw is attached from a side opposite to the bearing hole 26, so that the turning member 70 can be attached to the base member 14.

Specific embodiments have been explained above, however, the present invention is not limited to the aforementioned embodiments, and can be widely modified. The shaft wall member wherein the projecting shaft and the projecting portion are formed may be provided in the base member, and the bearing wall member wherein the bearing hole is formed may be provided in the turning member. The cup holder may receive one or three or more containers, and the base member may be integrated with the peripheral wall of the box member. In a case wherein the head portion of the screw is used for the projecting portion, it is desirable that the bearing hole is a through hole, however, when the turning member is attached to the base member, in a case wherein the projecting portion is received in the bearing hole using the tapered face of the wall member wherein the bearing hole is provided and the tapered face of the projecting portion, the bearing hole may be the through hole or a bottomed hole.

EXPLANATION OF SYMBOLS

2 . . . a cup holder, 4 . . . a box member, 6 . . . a separator (pivotally supporting structure), 14 . . . a base member, 16, 60, 70 . . . turning members, 18 . . . a leg portion, 22 . . . bearing wall members, 26 . . . bearing holes, 30 . . . a plate spring, 38 . . . an oscillating member, 42 . . . a tray plate, 44 . . . shaft wall members, 46 . . . projecting shafts, 48, 64, 74 . . . projecting portions, 50, . . . tapered faces (of the turning member), 56 . . . a locking portion

What is claimed is:

1. A pivotally supporting structure for pivotally supporting a turning member in a base member, comprising:
   a pair of projecting shafts projected coaxially with each other in shaft wall members on right and left of one member of the turning member or the base member;
   bearing holes closely facing the shaft wall members and provided in a bearing wall member on right and left of another member of the turning member or the base member to receive the projecting shafts; and
   projecting portions projected on tip faces of the projecting shafts,
   wherein the turning member and the base member collide with each other so as to restrict a turning range between the turning member and the base member, and
   predetermined flexibility is provided in one or both of the shaft wall member and the bearing wall member so that when an external force beyond a limit of the turning range acts between the turning member and the base member, one or both of the shaft wall member and the bearing wall member having flexibility deforms, to disengage the projecting shaft out of the bearing hole, thereby engaging the projecting portion with the bearing hole.

2. The pivotally supporting structure according to claim 1, wherein as the turning member and the base member carry out relative turning to come close to the limit of the turning range, a spring member generating an urging force in a direction of inhibiting relative turning is provided between the shaft wall member and the bearing wall member.

3. The pivotally supporting structure according to claim 1, wherein a tapered face is formed at a tip of at least one of the projecting portions, and
   in the limit of the turning range, a side portion on a side where the tapered face is formed does not face a side where the projecting shaft and the bearing hole press each other.

4. A cup holder comprising:
a pivotally supporting structure according to claim 1; and
a box member internally fixing the base member of the pivotally supporting structure wherein an upper portion is open,
wherein the turning member includes an oscillating member extending in such a way as to form a surface parallel to a shaft line of turning, and a surface is disposed substantially horizontally in one limit of the turning range to face upwardly, to control a downward turning.

5. The cup holder according to claim 4, wherein the oscillating member further includes a back surface wherein an intermediate area in a right and left direction is curved in such a way as to be concaved relative to both right and left side portions; and a base end face connecting the surface and the back surface on a base end side, and
   right and left side portions of the base end face are locked in the base member so as to restrict the one limit of the turning range.

* * * * *